(12) United States Patent
Fatemi et al.

(10) Patent No.: US 12,374,946 B2
(45) Date of Patent: Jul. 29, 2025

(54) MULTI-CONDUCTIVITY WINDINGS FOR ELECTRIC MACHINES

(71) Applicant: GM Global Technology Operations LLC, Detroit, MI (US)

(72) Inventors: Alireza Fatemi, Canton, MI (US); Thomas W Nehl, Shelby Township, MI (US); Anil K Sachdev, Rochester Hills, MI (US); Anthony Michael Coppola, Rochester Hills, MI (US); Gokhan Cakal, Madison, WI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 18/310,780

(22) Filed: May 2, 2023

(65) Prior Publication Data

US 2024/0372425 A1 Nov. 7, 2024

(51) Int. Cl.
*H02K 3/02* (2006.01)

(52) U.S. Cl.
CPC ...................... *H02K 3/02* (2013.01)

(58) Field of Classification Search
CPC ......................................................... H02K 3/02
USPC ........................................................ 310/208
See application file for complete search history.

(56) References Cited

U.S. PATENT DOCUMENTS

| | | | |
|---|---|---|---|
| 2014/0015367 A1* | 1/2014 | Umehara | H02K 15/067 29/596 |
| 2014/0215806 A1* | 8/2014 | Yamaguchi | H02K 3/48 29/736 |
| 2017/0201134 A1* | 7/2017 | Motoishi | H02K 1/146 |
| 2018/0248433 A1* | 8/2018 | Okazaki | H02K 1/146 |
| 2022/0224179 A1* | 7/2022 | Lin | H02K 3/50 |
| 2022/0271633 A1* | 8/2022 | Takahashi | H02K 3/522 |
| 2023/0039361 A1* | 2/2023 | Mawatari | H02K 3/34 |
| 2024/0348119 A1* | 10/2024 | Alahyari | H02K 3/32 |
| 2024/0372425 A1* | 11/2024 | Fatemi | H02K 3/02 |

* cited by examiner

*Primary Examiner* — Rashad H Johnson
(74) *Attorney, Agent, or Firm* — CANTOR COLBURN LLP (57) ABSTRACT

An electric machine includes a stator, a rotor configured to rotate relative to the stator, an air gap between the stator and the rotor, and a conductive winding disposed in the rotor or the stator. The conductive winding includes a first portion having a first conductivity and a second portion having a second conductivity, the second portion disposed radially between the first portion and the air gap, the first conductivity being different than the second conductivity.

20 Claims, 7 Drawing Sheets

MULTI-CONDUCTIVITY WINDINGS FOR ELECTRIC MACHINES

INTRODUCTION

The subject disclosure relates to electric machines, and more particularly to windings for electric machines.

Electric motors, including permanent magnet motors, are used in a variety of contexts. For example, electric and hybrid vehicles feature electric motors for propulsion. An electric machine or motor includes a rotor, a stator, and multiple conductive windings. Precise design of the windings is important to ensure proper performance and efficiency.

SUMMARY

In one exemplary embodiment, an electric machine includes a stator, a rotor configured to rotate relative to the stator, an air gap between the stator and the rotor, and a conductive winding disposed in the rotor or the stator. The conductive winding includes a first portion having a first conductivity and a second portion having a second conductivity, the second portion disposed radially between the first portion and the air gap, the first conductivity being different than the second conductivity.

In addition to one or more of the features described herein, the second conductivity is less than the first conductivity.

In addition to one or more of the features described herein, the conductive winding is disposed in a plurality of slots of the stator or the rotor, the plurality of slots defined by a plurality of radially extending teeth.

In addition to one or more of the features described herein, the first portion includes a first conductor disposed at a first radial position along a tooth, and the second portion includes a second conductor disposed at a second radial position along the tooth that is closest to the air gap.

In addition to one or more of the features described herein, the conductive winding is disposed in the stator, the plurality of slots and the tooth extend radially inwardly toward a center of the stator, and the second conductor is disposed at an innermost radial position in each slot.

In addition to one or more of the features described herein, the conductive winding is disposed in the rotor, the plurality of slots and the tooth extend radially outwardly toward a periphery of the rotor, and the second conductor is disposed at an outermost radial position in each slot.

In addition to one or more of the features described herein, the second portion includes a multi-material conductor including a first material and a second material, wherein the first material has a lower conductivity than the second material.

In addition to one or more of the features described herein, the second material has a lower conductivity that the first material, and the second material is disposed closest to the air gap.

In addition to one or more of the features described herein, the multi-material conductor includes at least one of a cladded conductor and a segmented conductor.

In another exemplary embodiment, a method of manufacturing a component of an electric machine includes forming a first conductor into a shape conductive for insertion into a rotor or a stator, the first conductor having a first conductivity, forming a second conductor having a second conductivity into the shape, the second conductivity being different than the first conductivity, inserting the first conductor into a pair of slots of the rotor or the stator, the pair of slots formed between a plurality of teeth, and inserting the second conductor into the pair of slots. The second conductor is inserted such that the first conductor and the second conductor are positioned radially along a tooth and the second conductor is positioned closer to an air gap than the first conductor, the air gap being a separation between the rotor and the stator when the rotor and the stator are assembled as part of the electric machine.

In addition to one or more of the features described herein, the method further includes assembling the rotor and the stator to create an electric machine, and electrically connecting the first conductor and the second conductor to a power source.

In addition to one or more of the features described herein, the method further includes electrically connecting the first conductor to the second conductor.

In addition to one or more of the features described herein, the first conductor is inserted axially into the pair of slots, and the first conductor is subsequently connected to the second conductor at an end of the rotor or the stator.

In addition to one or more of the features described herein, the first conductor is connected to the second conductor, and the connected first and second conductors are inserted radially into the pair of slots.

In addition to one or more of the features described herein, the second conductor is a multi-material conductor including a first material and a second material, the first material has a lower conductivity than the second material, and the second conductor is inserted such that the second material is disposed closest to the air gap.

In yet another exemplary embodiment, a system of a vehicle includes an electric motor including a stator, a rotor configured to rotate relative to the stator, and an air gap between the stator and the rotor. The electric motor includes a conductive winding disposed in the rotor or the stator, the conductive winding including a first portion having a first conductivity and a second portion having a second conductivity, the second portion disposed radially between the first portion and the air gap, the first conductivity being different than the second conductivity.

In addition to one or more of the features described herein, the second conductivity is less than the first conductivity.

In addition to one or more of the features described herein, the conductive winding is disposed in a plurality of slots of the stator or the rotor, the plurality of slots is defined by a plurality of radially extending teeth, the first portion includes a first conductor disposed at a first radial position along a tooth, and the second portion includes a second conductor disposed at a second radial position along the tooth that is closest to the air gap.

In addition to one or more of the features described herein, the conductive winding is disposed in the stator, the plurality of slots and the tooth extend radially inwardly toward a center of the stator, and the second conductor is disposed at an innermost radial position in each slot.

In addition to one or more of the features described herein, the conductive winding is disposed in the rotor, the plurality of slots and the tooth extend radially outwardly toward a periphery of the rotor, and the second conductor is disposed at an outermost radial position in each slot.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, electric machines and methods of manufacturing and using electric machines are provided. An embodiment of an electric machine includes a stator and/or a rotor that includes one or more conductor windings, in which at least one winding includes conductors or portions having different conductivities. A "winding" may refer to one or more conductors that are electrically connected and disposed in a rotor or stator. A winding may include a single conductor wound around a stator or rotor tooth or teeth, or multiple conductors connected at ends of the stator or rotor. In addition, multiple windings may be connected in series and wound around multiple teeth (e.g., a phase winding of a multi-phase motor).

An embodiment of an electric machine includes at least one winding that has a first portion having a relatively high electrical conductivity and a second portion that has a relatively low conductivity. The second portion may be disposed on a radially extending tooth and is arranged radially with respect to the first portion, such that the second portion is disposed radially between the first portion and an air gap. Thus, the relatively low conductivity portion is closest to the air gap. An "air gap" is a specified separation between a rotor and a stator when an electric machine is assembled. It is noted that high and low conductivities are described herein in relative terms and are not intended to limit the conductivities to any particular value or range.

Embodiments described herein present numerous advantages and technical effects. For example, an electric machine having windings as described herein has an improved efficiency as compared to existing electric machines. For example, the arrangements of conductors or portions described herein reduce skin effects and proximity effects by providing in increased effective resistivity of conductors closest to an air gap.

Electrical alternating current (AC) losses in motor windings account for a significant amount of energy loss, particularly at high speeds. Such losses are concentrated at a motor's air gap, and can result in detrimental effects such as range reduction and increased load on other vehicle systems (e.g., thermal management system). Embodiments described herein address this limitation and reduce or substantially eliminate AC losses due to, for example, skin and proximity effects.

The embodiments are not limited to use with any specific vehicle or device or system that utilizes battery assemblies, and may be applicable to any of various contexts in which electric machines are utilized. Examples of such context include automobiles, trucks and other commercial vehicles, aircraft, construction equipment, farm equipment, automated factory equipment and/or any other device or system that may use an electric motor or generator, or operate the electric motor or generator at high speeds.

Figure 1:
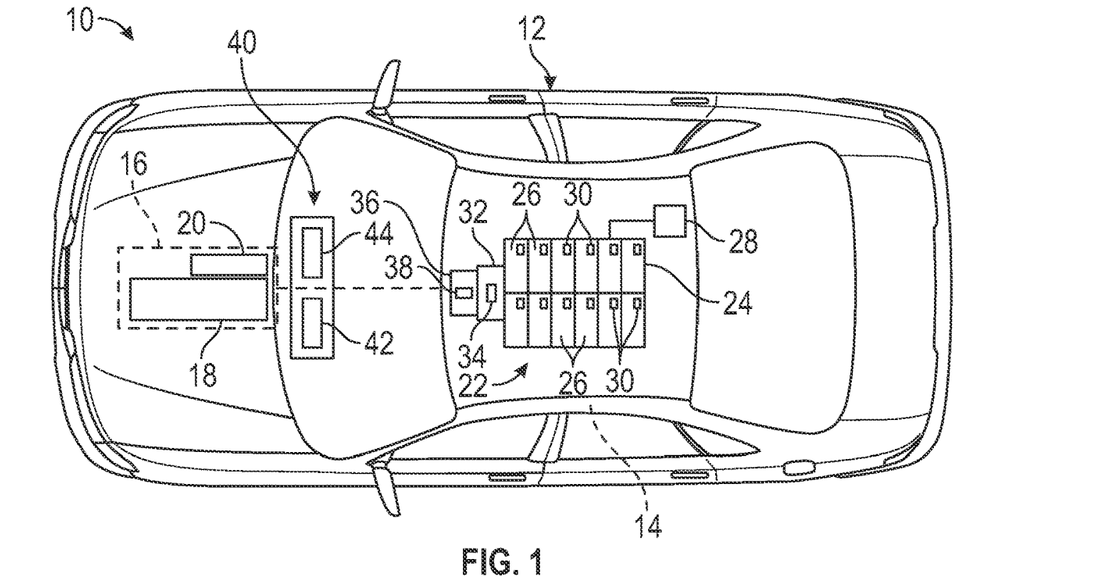
FIG. 1 is a top schematic view of a motor vehicle including a battery assembly and a propulsion system including an electric machine, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid electric vehicle (HEV). In an example, the vehicle 10 is a hybrid vehicle that includes a combustion engine 18 and an electric motor 20. The electric motor 20 is a three-phase (or multiphase) electric machine that has a conductor winding (not shown) for each phase of the motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include a DC-DC converter module 32 that is electrically connected to the battery system 22 and includes a DC-DC converter circuit (converter) 34. The conversion devices also include an inverter module 36 that includes an inverter 38. The inverter 38 receives DC power from the DC-DC converter 34 and converts direct current (DC) power to alternating current (AC) power that is supplied to the electric motor 20.

The vehicle 10 also includes a computer system 40 that includes one or more processing devices 42 and a user interface 44. The various processing devices and units may communicate with one another via a communication device or system, such as fast parallel communication, a controller area network (CAN) or transmission control protocol (TCP) bus.

Figure 2:
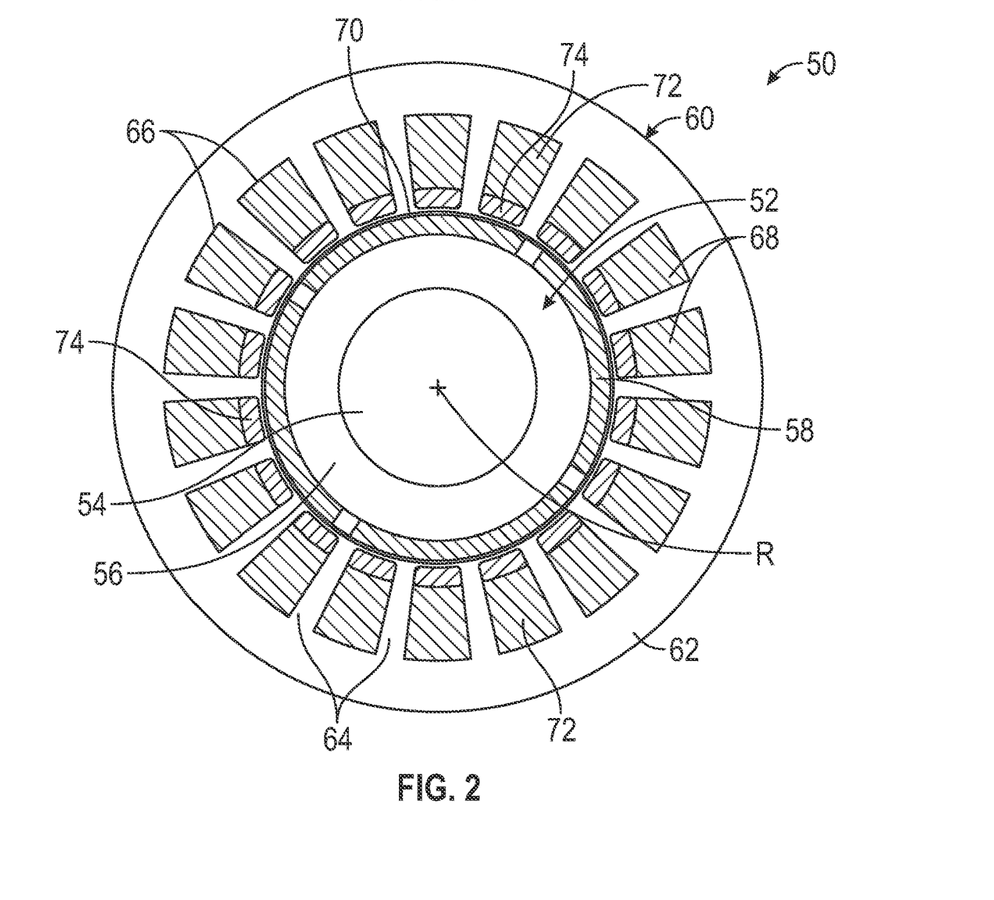
FIG. 2 depicts a cross-section of an electric machine, in accordance with an exemplary embodiment.

FIG. 2 depicts an embodiment of an electric machine 50. The electric machine 50 may be a three-phase or multi-phase electric motor, such as the motor 20. The electric machine 50 is not so limited, and may be configured as a motor and/or generator for any desired purpose.

The electric machine 50 includes a rotor 52 that is mounted on a shaft 54 and rotates about a longitudinal axis or rotational axis R. The rotor 52 includes a cylindrical rotor body (yoke or core) 56 and one or more permanent magnets. For example, the rotor 52 includes a plurality of permanent magnets 58 arrayed along a circumference of the rotor body 56.

The electric machine 50 also includes a stator 60 having a hollow cylindrical stator body 62 (yoke) that surrounds the rotor 52. The stator body 62 includes a plurality of teeth 64, in which each tooth 64 projects radially inwardly toward the rotor 52. A plurality of slots 66 are defined by the stator body 62 and the teeth 64, where each slot 66 is defined between two adjacent teeth 64.

A plurality of stator windings 68 are wound through or otherwise disposed within each slot 66. The stator windings 68 are formed from electrical conductors made from aluminum, copper and/or other conductive materials.

For example, the windings 68 are strands or wires of a suitable conductive material (e.g., copper or aluminum, or a combination thereof) and are woven or otherwise arranged into sets of conductors that are inserted into the slots 66. Current flow through the windings 68 is used to generate rotating magnetic fields that act on the rotor 52 to induce torque on the shaft 54.

In an electric machine, a winding 68 includes a set of conductors that are wound around a magnetic core to create a magnetic field that interacts with the stator or rotor of the machine. In a multi-phase electric machine, there are multiple windings 68, with each winding corresponding to a different phase of a power supply.

There is typically a separation between a rotor and a stator, referred to as an "air gap," which is provided to accommodate manufacturing tolerances and facilitate assembly and manufacture. The air gap also facilitates proper operation by, for example, preventing rubbing during rotation of the rotor. For example, as shown in FIG. 2, the electric machine includes an air gap 70 that is defined between radially inner surfaces of the teeth 64 and a radially outer surface of the rotor 52.

In an embodiment, the windings 68 are configured so that the windings have at least two different electrical conductivities. For example, each winding 68 includes a first set (i.e., one or more) of conductors forming a first portion 72. The first portion 72 and the conductors thereof have a first conductivity. A second portion 74 of the set of windings 68 is disposed radially between the air gap 70 and the first portion 72. In other words, the second portion 74 is positioned closest to the air gap 70 as compared to other conductors in the set of windings.

The portions may have any suitable conductivity. For example, each portion has a conductivity between about $3 \times 10^7$ to $6 \times 10^7$ S/m.

Figure 3A:
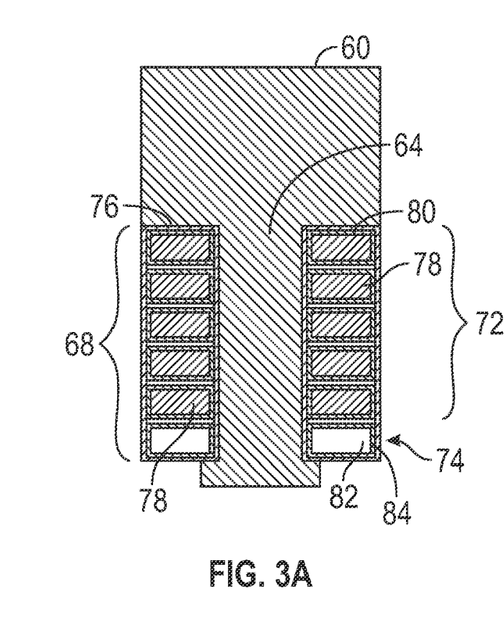
FIGS. 3A, 3B and 3C depicts examples of windings of an electric machine, the windings including high conductivity portions and low conductivity portions, in accordance with an exemplary embodiment.
Figure 3B:
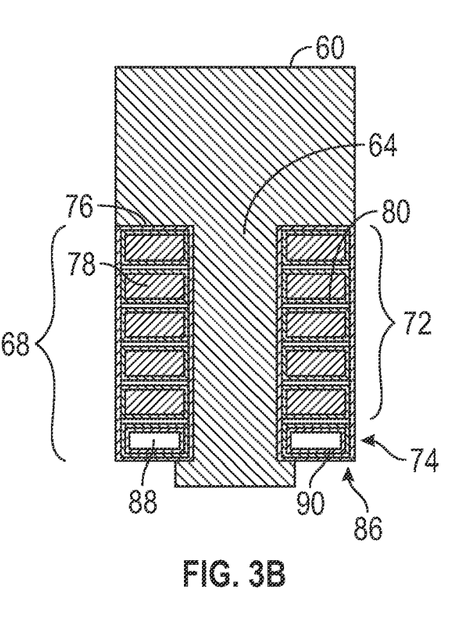
Figure 3C:
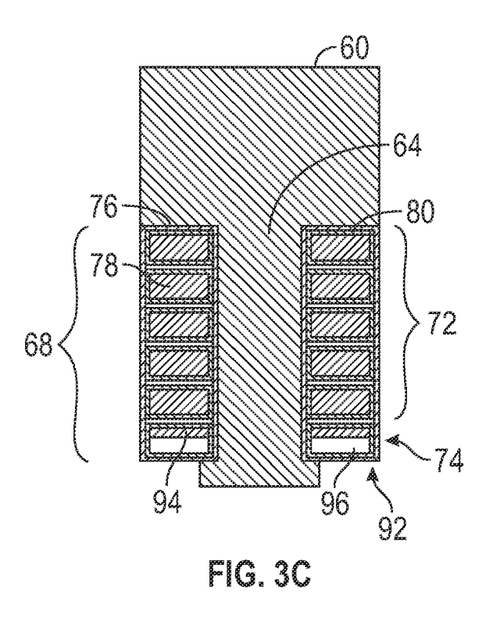

FIGS. 3A-3C depict a portion of the stator 60 including a tooth 64, and example of a winding 68. The winding 68 may be provided around a single tooth, and thus the conductors are disposed along both sides of the tooth. However, in other instances, the winding may be wrapped around multiple teeth, such that the tooth 64 has different windings 68 on each side.

In this example, the winding 68 is a multi-layer winding structure that includes a plurality of separate conductors arrayed radially along a slot 66 adjacent to the tooth 64. The conductors are insulated from the stator body by a slot liner 76 made from a suitable insulating material.

The first portion 72 includes a plurality of conductors arrayed radially along the tooth 64. In this example, the first portion 72 includes five conductors, and the second portion 74 includes one conductor. Embodiments are not so limited, as either portion may have any desired number of conductors.

The first portion 72 includes conductors having a relatively high conductivity as compared to the second portion 74. For example, each conductor includes a copper bar conductor 78 coated with an enamel 80 or other material or component that maintains sufficient separation between conductors for galvanic isolation.

The second portion 74 is formed from one or more conductors, and is designed or configured such that the conductivity of the second portion 74 is less than the conductivity of the first portion 72. In this example, the second portion 74 is disposed at an innermost radial location along the tooth 64, so that the second portion 74 is closest to the air gap 70. In other embodiments, such as in a rotor or stator having outwardly facing teeth, the second portion 74 may be an outermost portion.

FIGS. 3A-3C show various examples of materials and designs that can be used to form the second portion 74. FIG. 3A shows an example in which the second portion 74 includes a bar conductor 82 made from aluminum (or other material having a lower conductivity than the material of the first portion, such as copper). The bar conductor 82 is coated with an enamel 84 or other suitable separator.

In an embodiment, the second portion 74 includes at least one multi-material conductor, which includes at least two different materials selected so that the conductor defines regions having different conductivities.

FIG. 3B depicts an example in which the second portion 74 includes a multi-material conductor configured as a cladded conductor 86. The cladded conductor 86 includes an inner conductor 88 surrounded by a conductive cladding 90. In an embodiment, the inner conductor 88 has a lower conductivity than the cladding 90. For example, the inner conductor 88 is aluminum and the cladding 90 is copper.

FIG. 3C depicts an example in which the second portion 74 includes a segmented conductor 92. The segmented conductor includes a plurality of segments surrounded by enamel (or other separator), where at least one segment defines a region that has a different conductivity than one or more other regions in the segmented conductor 92.

For example, as shown in FIG. 3C, two upper segments are made from a higher conductivity material such as copper and form a high conductivity region 94, and two lower segments are made from a lower conductivity material such as aluminum and form a low conductivity region 96. As shown, in an embodiment, the segmented conductor 92 is arranged so that the low conductivity region 96 faces the end of the tooth 64, and thus faces an air gap when the stator 60 is assembled into an electric machine.

FIGS. 4A-4D depict examples of the segmented conductor 92. In each example, the segmented conductor includes an outer coating 98 (e.g., enamel). A plurality of segments 100 are surrounded by the outer coating 98. There may be any number of segments 100, and the segments may have different sizes and/or shapes. In addition, each segment may be formed by a single body or formed by a bundle of conductors.

Figure 4A:
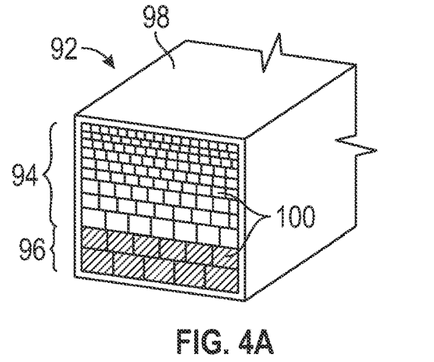
FIGS. 4A, 4B, 4C and 4D depicts examples of segmented conductors including high conductivity regions and low conductivity regions, in accordance with an exemplary embodiment.
Figure 4B:
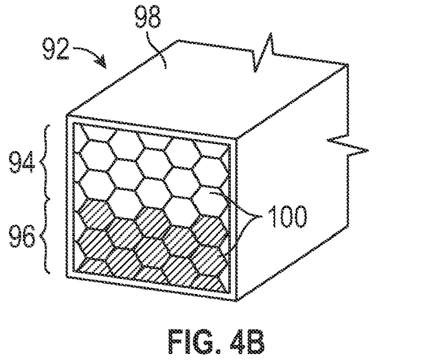
Figure 4C:
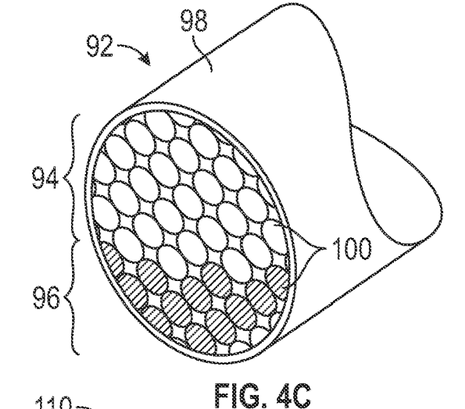
Figure 4D:
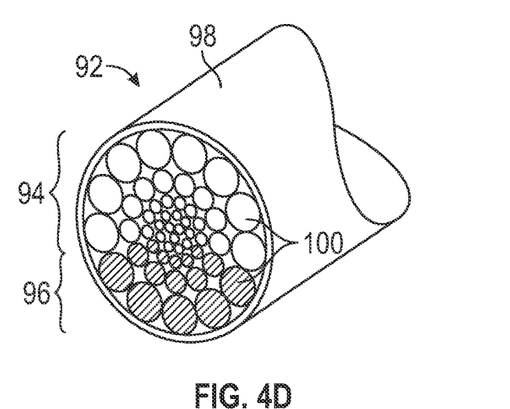

For example, FIG. 4A shows a rectangular conductor having a plurality of rectangular segments 100. The rectangular segments 100 have variable sizes as shown. FIG. 4B shows a rectangular conductor having a plurality of hexagonal segments 100. FIG. 4C shows a cylindrical conductor having a plurality of round segments 100. FIG. 4D shows a cylindrical conductor having a plurality of variable size round segments 100.

As shown, a low conductivity region 94 is established by including a set of segments 100 made from a low conductivity material (e.g., aluminum) or otherwise having a low conductivity. A high conductivity region 96 is defined by a set of segments 100 made from a high conductivity material (e.g., copper) or otherwise having a high conductivity. It is noted that the number and location of segments used to define each region is not limited to this example.

In addition to providing increased resistivity (lower conductivity), multi-material conductors have a lower cost that single-material conductors with uneven cross sections. Such conductors also provide a mass reduction, and may have a higher strength than single-material conductors. For example, a multi-material conductor that has both aluminum and copper (cladded or segmented) has a higher strength than a pure aluminum conductor.

The machines and windings described herein may be manufactured in any suitable manner.

Figure 5:
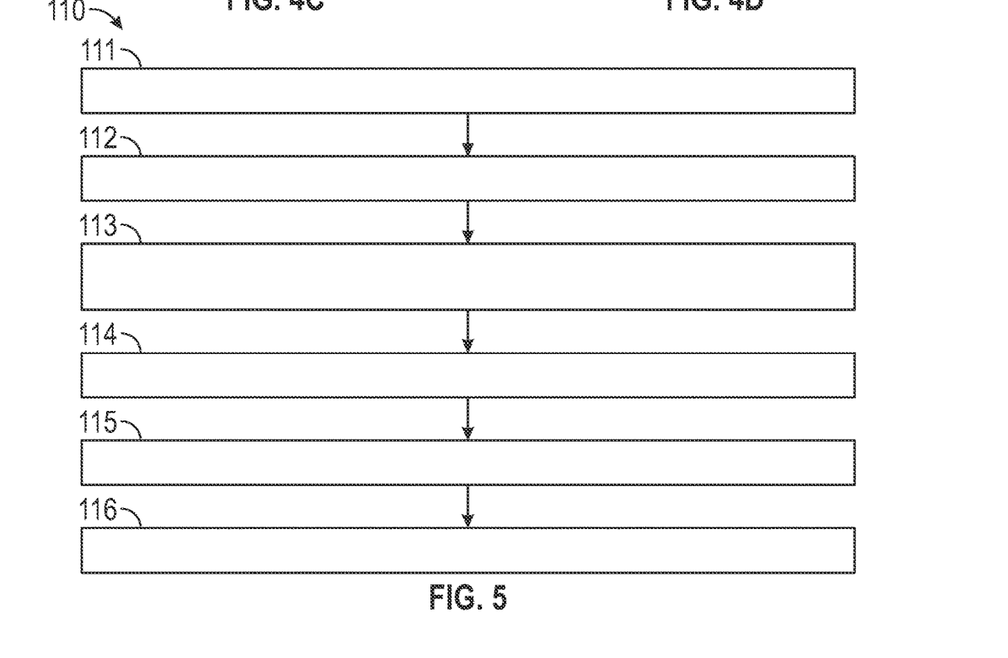
FIG. 5 is a flow diagram depicting aspects of a method of manufacturing components of an electric machine, in accordance with an exemplary embodiment.

FIG. 5 depicts aspects of a method 110 of manufacturing or assembling a winding for an electric machine, such as a motor. The winding may be wound around one or more teeth of a rotor or a stator, or otherwise disposed in the rotor or the stator. The method 110 is applicable, for example, to manufacturing techniques in which each conductors are inserted into the rotor or the stator prior to connecting the conductors to form the winding. For example, the insertion steps discussed below are performed by a hairpin winding machine.

The method 110 includes a number of steps or stages represented by blocks 111-116. The method 110 is not limited to the number or order of steps therein, as some steps represented by blocks 111-116 may be performed in a different order than that described below, or fewer than all of the steps may be performed.

One or more of the steps or stages of the method 110 may be performed by a processor or processors, such as a process or controller connected to a manufacturing system or a hairpin winding machine. It is noted that the method is not so limited and may be performed by any suitable processing device or system, or combination of processing devices.

At stage 111, conductive materials are acquired, including at least two materials having different conductivities. For example, conductors such as wires, rods or bars (e.g., round, flat or rectangular) are shaped to facilitate insertion into slots of a rotor or a stator. For example, each conductor is shaped in a hairpin configuration. At least one of the conductors is formed from a relatively high conductivity material (e.g., copper), and the remaining conductors are formed from a relatively low conductivity material (e.g., aluminum or multi-material conductor).

At stage 112, the high conductivity wire or conductor is inserted into one or more slots of a rotor or a stator body. A single length of the high conductivity conductor may be inserted. If multiple high frequency conductors are used, they are each inserted into one or more slots to form multiple rows or layers of high conductivity conductors along each slot.

At stage 113, a low conductivity conductor is inserted into the one or more slots. If a segmented conductor is used as the low conductivity conductor, the segmented conductor is arranged so that low conductivity segments face an air gap (when the rotor or stator is assembled as an electric machine). If the conductors are wound with transposition, the segmented conductor includes high conductivity segments on an outer shell of the conductor, with low conductivity segments in an interior of the conductor.

At stage 114, if the winding includes multiple high conductivity conductors, the high conductivity conductors are electrically connected to each other by welding or by another suitable joining technique. The connections may be formed at ends of the stator or the rotor (e.g., at end turns).

The low conductivity conductor is electrically connected to the high conductivity conductor(s) by welding or other technique. In an embodiment, the low conductivity conductor is connected to an end of a high conductivity conductor by a technique suitable for joining dissimilar metals, such as bimetallic friction welding or laser brazing. It is noted that there may be more than one low conductivity conductor; if so, the low frequency conductors may be connected (e.g., via welding).

At stage 115, a number of additional windings are created as desired. One or more of the additional windings may include high and low conductivity portions as described herein.

At stage 116, after the windings are installed in a rotor, the wound rotor is assembled with a stator and suitable additional steps or processes are performed to complete manufacture of an electric machine. If the windings are installed in a stator, the wound stator is assembled with a rotor as part of manufacturing the electric machine.

Figure 6:
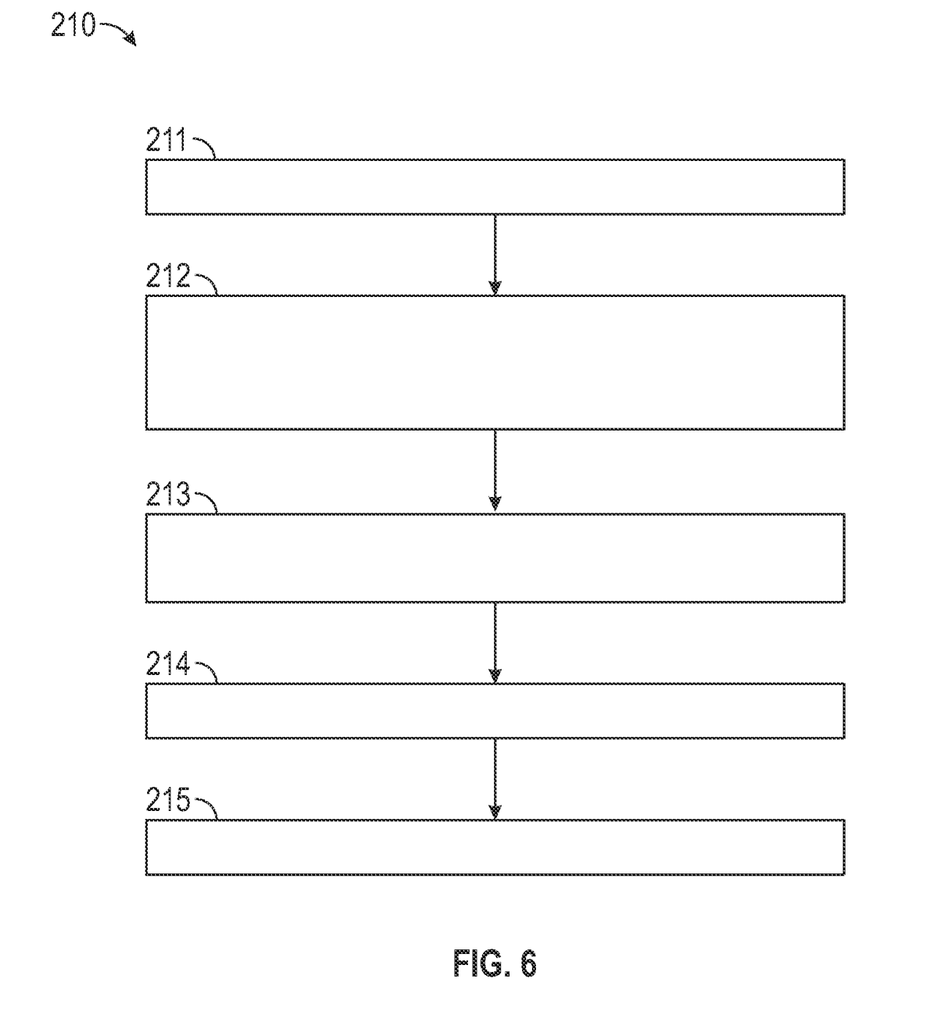
FIG. 6 is a flow diagram depicting aspects of a method of manufacturing components of an electric machine, in accordance with an exemplary embodiment.

FIG. 6 depicts aspects of a method 210 of manufacturing or assembling a winding for an electric machine, such as a motor. The winding may be wound around one or more teeth of a rotor or a stator, or otherwise disposed in the rotor or the stator. The method is applicable, for example, to manufacturing techniques in which each winding is fully formed prior to insertion into a stator or a rotor. For example, the insertion steps discussed below are performed by a continuous hairpin winding machine.

The method 210 includes a number of steps or stages represented by blocks 211-215. The method 210 is not limited to the number or order of steps therein, as some steps represented by blocks 211-215 may be performed in a different order than that described below, or fewer than all of the steps may be performed.

One or more of the steps or stages of the method 210 may be performed by a processor or processors, such as a process or controller connected to a manufacturing system or a continuous hairpin winding machine. It is noted that the method is not so limited and may be performed by any suitable processing device or system, or combination of processing devices.

At stage 211, conductive materials are acquired, including at least two materials having different conductivities. For example, conductors such as wires, rods or bars (e.g., round, flat or rectangular) are shaped to facilitate insertion into slots of a rotor or a stator. For example, each conductor is shaped in a hairpin configuration. At least one of the conductors is formed from a relatively high conductivity material (e.g., copper), and the remaining conductors are formed from a relatively low conductivity material (e.g., aluminum or multi-material conductor).

At stage 212, electric connections are formed between the conductors, to form a winding that will be subsequently inserted into a rotor or a stator. if the winding includes multiple high conductivity conductors, the high conductivity conductors are electrically connected to each other by welding or by another suitable joining technique.

The low conductivity conductor is electrically connected to the high conductivity conductor(s) by welding or other technique. In an embodiment, the low conductivity conductor is connected to an end of a high conductivity conductor by a technique suitable for joining dissimilar metals, such as bimetallic friction welding or laser brazing. If there are multiple low conductivity conductors, the low conductivity conductors are welded or joined.

At stage 213, the connected high conductivity conductor(s) and the low conductivity conductor are inserted as a single assembly or unit into the rotor or the stator. In an embodiment, the connected conductors are inserted radially into slots of a rotor or a stator body, and form multiple rows or layers of high conductivity conductors along each slot.

If a segmented conductor is used as the low conductivity conductor, the segmented conductor is arranged so that low conductivity segments face an air gap (when the rotor or stator is assembled as an electric machine). If the conductors are wound with transposition, the segmented conductor includes high conductivity segments on an outer shell of the conductor, with low conductivity segments in an interior of the conductor.

At stage 214, a number of additional windings are created as desired. One or more of the additional windings may include high and low conductivity portions as described herein.

At stage 215, after the windings are installed in a rotor, the wound rotor is assembled with a stator and suitable additional steps or processes are performed to complete manufacture of an electric machine. If the windings are installed in a stator, the wound stator is assembled with a rotor as part of manufacturing the electric machine.

Figure 7A:
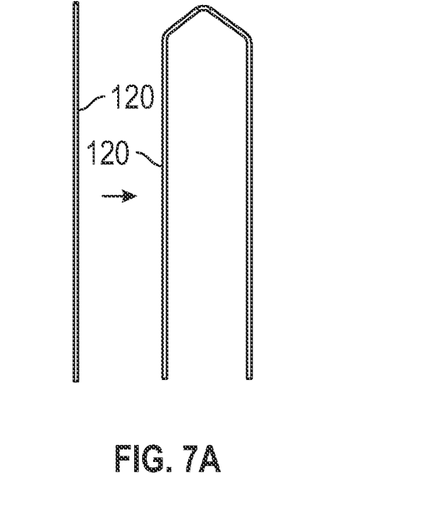
FIGS. 7A-7D depict aspects of an example of the method of FIG. 5.
Figure 7B:
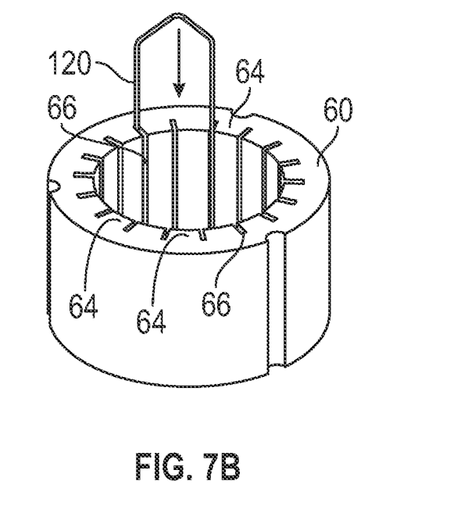
Figure 7C:
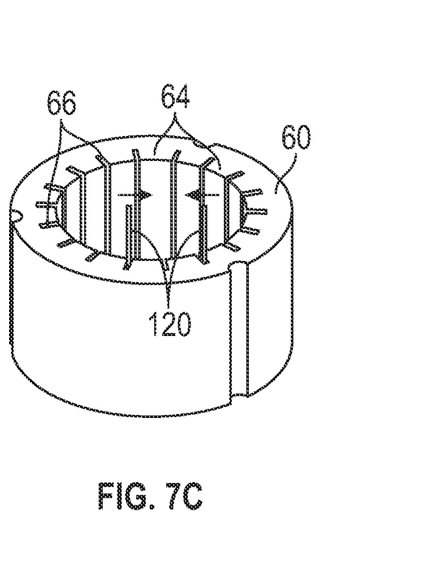
Figure 7D:
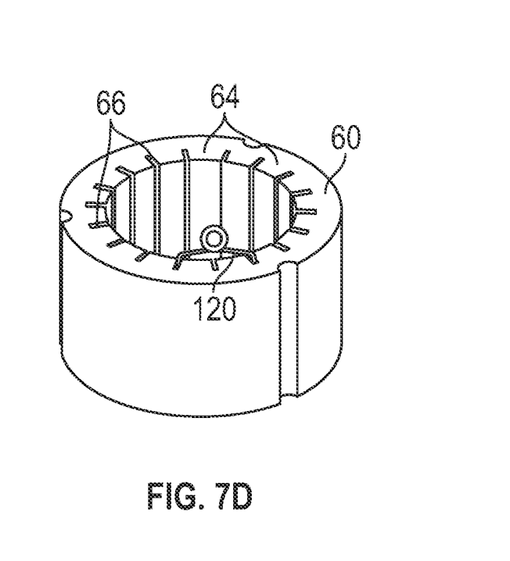
Figure 8:
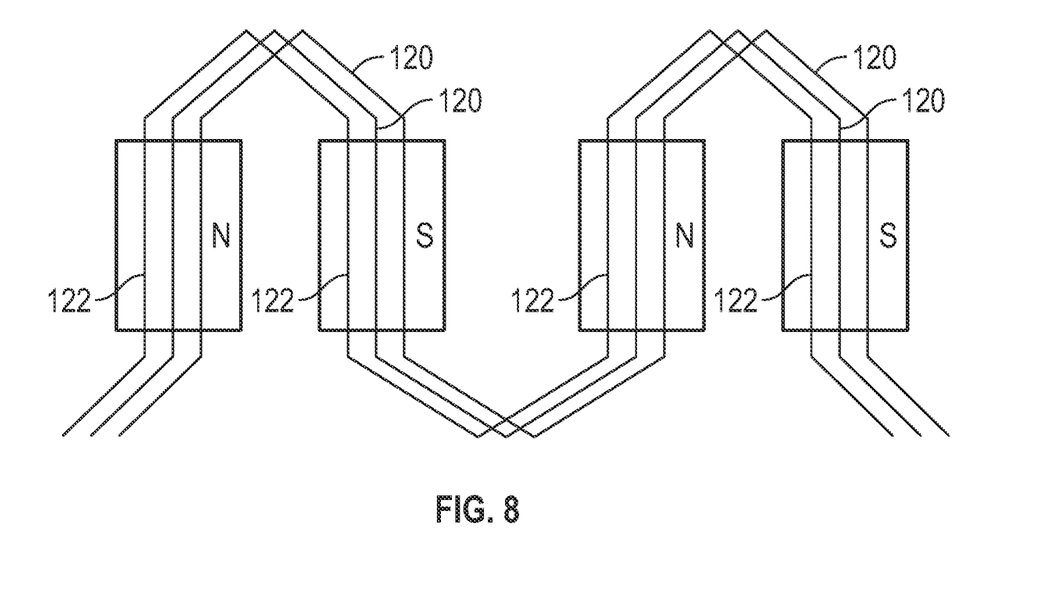
FIG. 8 depicts an example of the method of FIG. 6.

FIGS. 7A-D depict an example of aspects of the method 110, and FIG. 8 depicts examples of aspects of the method 210. These examples are discussed in conjunction with the stator body 60. However, the examples are applicable to other types of stators and various types of rotors.

In an example, as shown in FIG. 7A, a conductor such as a copper wire 120 is bent into a hairpin shape. At FIG. 7B, the hairpin-shaped wire 120 is inserted radially into slots 66. Subsequently, the ends of the wire 120 are twisted (FIG. 7C), and then are contacted by welding or other suitable joining technique (FIG. 7D).

If multiple layers or rows of high conductivity material are desired, one or more additional copper wires may be inserted and connected in series to the wire 120. Once a desired number of copper wires are connected, a low conductivity conductor such as an aluminum wire is connected to an end of a copper wire and inserted. The wires are inserted in a manner such that the aluminum wire is positioned radially along the teeth 66, and the aluminum wire is the innermost conductor along the teeth 66.

FIG. 8 shows an alternative for winding the stator body 60 using the method 210. In this example, copper wires 120 are shaped into hair pins and connected prior to insertion. At least one aluminum wire 122 (or other low conductivity conductor) is provided and shaped into one or more hair pins. The shaped wires are than inserted radially into slots 66 as a unit.

Embodiments are not limited to permanent magnet motors, and may be applied to any electric machine. Another type of machine is a wound rotor electric machine, which includes windings in both the rotor and stator. Embodiments may be applicable to windings for both the rotor and stator of this type of machine.

Figure 9:
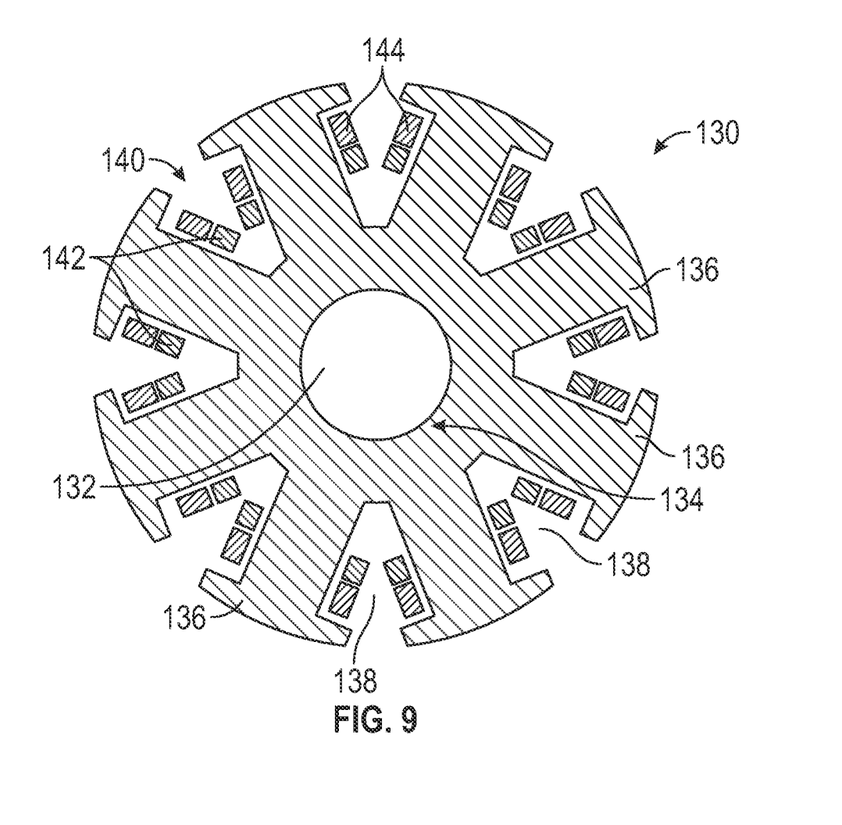
FIG. 9 depicts a cross-section of a rotor of an electric machine, the rotor including windings having high conductivity portions and low conductivity portions, in accordance with an exemplary embodiment.

FIG. 9 shows an example of windings arranged in a rotor 130 for a wound field electric motor. In this example, the rotor 130 is mounted on a shaft 132, and has a rotor body 134 that defines a plurality of radially extending teeth 136 and slots 138. The rotor 130 includes windings 140, where each winding 140 includes a high conductivity portion 142 and a low conductivity portion 144.

The rotor 130, when assembled in an electric machine, is surrounded by a stator. Thus, an air gap would be established around the periphery of the rotor body 132. For this reason, the low conductivity portion 144 is located at a radial position along the teeth 136, so that the low conductivity portion 144 is an outermost portion and will be closest to the air gap when the electric machine is assembled.

Figure 10:
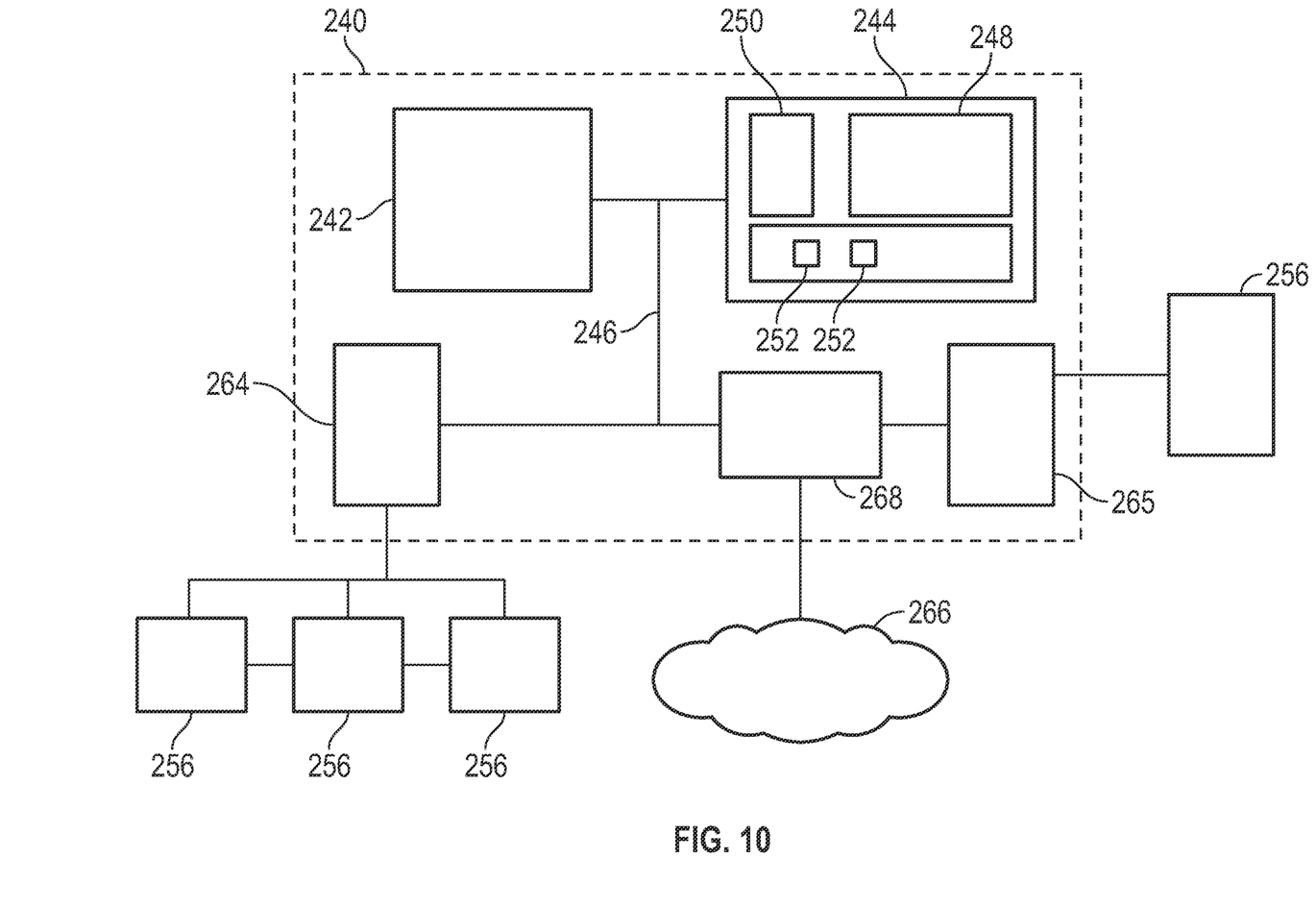
FIG. 10 depicts a computer system in accordance with an exemplary embodiment.

FIG. 10 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (e.g., at least one) of program modules that are configured to carry out functions of the embodiments described herein. For example, the system memory 244 stores various program modules that generally carry out the functions and/or methodologies of embodiments described herein. A module or modules 252 may be included to perform functions related to controlling manufacturing operations and/or control of an electric machine. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 240. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric machine comprising:
    a stator;
    a rotor configured to rotate relative to the stator;
    an air gap between the stator and the rotor; and
    a conductive winding disposed in the rotor or the stator, the conductive winding including a first portion having a first conductivity and a second portion having a second conductivity, the second portion disposed radially between the first portion and the air gap, the first conductivity being different than the second conductivity.

2. The electric machine of claim 1, wherein the second conductivity is less than the first conductivity.

3. The electric machine of claim 2, wherein the conductive winding is disposed in a plurality of slots of the stator or the rotor, the plurality of slots defined by a plurality of radially extending teeth.

4. The electric machine of claim 3, wherein the first portion includes a first conductor disposed at a first radial position along a tooth, and the second portion includes a second conductor disposed at a second radial position along the tooth that is closest to the air gap.

5. The electric machine of claim 4, wherein the conductive winding is disposed in the stator, the plurality of slots and the tooth extend radially inwardly toward a center of the stator, and the second conductor is disposed at an innermost radial position in each slot.

6. The electric machine of claim 4, wherein the conductive winding is disposed in the rotor, the plurality of slots and the tooth extend radially outwardly toward a periphery of the rotor, and the second conductor is disposed at an outermost radial position in each slot.

7. The electric machine of claim 1, wherein the second portion includes a multi-material conductor including a first material and a second material, wherein the first material has a lower conductivity than the second material.

8. The electrical machine of claim 7, wherein the second material has a lower conductivity that the first material, and the second material is disposed closest to the air gap.

9. The electric machine of claim 7, wherein the multi-material conductor includes at least one of a cladded conductor and a segmented conductor.

10. A method of manufacturing a component of an electric machine, the method comprising;
    forming a first conductor into a shape conductive for insertion into a rotor or a stator, the first conductor having a first conductivity;
    forming a second conductor having a second conductivity into the shape, the second conductivity being different than the first conductivity;
    inserting the first conductor into a pair of slots of the rotor or the stator, the pair of slots formed between a plurality of teeth; and
    inserting the second conductor into the pair of slots, wherein the second conductor is inserted such that the first conductor and the second conductor are positioned radially along a tooth and the second conductor is positioned closer to an air gap than the first conductor, the air gap being a separation between the rotor and the stator when the rotor and the stator are assembled as part of the electric machine.

11. The method of claim 10, further comprising assembling the rotor and the stator to create an electric machine, and electrically connecting the first conductor and the second conductor to a power source.

12. The method of claim 10, further comprising electrically connecting the first conductor to the second conductor.

13. The method of claim 12, wherein the first conductor is inserted axially into the pair of slots, and the first conductor is subsequently connected to the second conductor at an end of the rotor or the stator.

14. The method of claim 12, wherein the first conductor is connected to the second conductor, and the connected first and second conductors are inserted radially into the pair of slots.

15. The method of claim 10, wherein the second conductor is a multi-material conductor including a first material and a second material, the first material has a lower conductivity than the second material, and the second conductor is inserted such that the second material is disposed closest to the air gap.

16. A system of a vehicle, comprising:
an electric motor including a stator, a rotor configured to rotate relative to the stator, and an air gap between the stator and the rotor, the electric motor including a conductive winding disposed in the rotor or the stator, the conductive winding including a first portion having a first conductivity and a second portion having a second conductivity, the second portion disposed radially between the first portion and the air gap, the first conductivity being different than the second conductivity.

17. The system of claim 16, wherein the second conductivity is less than the first conductivity.

18. The system of claim 17, wherein the conductive winding is disposed in a plurality of slots of the stator or the rotor, the plurality of slots is defined by a plurality of radially extending teeth, the first portion includes a first conductor disposed at a first radial position along a tooth, and the second portion includes a second conductor disposed at a second radial position along the tooth that is closest to the air gap.

19. The system of claim 18, wherein the conductive winding is disposed in the stator, the plurality of slots and the tooth extend radially inwardly toward a center of the stator, and the second conductor is disposed at an innermost radial position in each slot.

20. The system of claim 18, wherein the conductive winding is disposed in the rotor, the plurality of slots and the tooth extend radially outwardly toward a periphery of the rotor, and the second conductor is disposed at an outermost radial position in each slot.

* * * * *